United States Patent [19]

Zador et al.

[11] Patent Number: 5,456,975

[45] Date of Patent: Oct. 10, 1995

[54] CURL RESISTANT COATED ABRASIVE BACKING WITH RADIATION CURABLE CLOTH FINISHING ADDITIVE

[75] Inventors: Eugene Zador, Clifton Park; Dhiraj H. Darjee, Malta; Stanley J. Supkis, Sand Lake, all of N.Y.

[73] Assignee: Norton Company, Worcester, Mass.

[21] Appl. No.: 681,442

[22] Filed: Apr. 3, 1991

Related U.S. Application Data

[63] Continuation of Ser. No. 201,647, Jun. 2, 1988, abandoned.

[51] Int. Cl.$^6$ ........................................................ B32B 5/02
[52] U.S. Cl. .................... 428/241; 428/255; 428/265; 428/272
[58] Field of Search .................................. 428/241, 255, 428/265, 272

Primary Examiner—Jenna L. Davis
Attorney, Agent, or Firm—David Bennett

[57] ABSTRACT

This invention relates to the construction of backings for coated abrasive products that avoid curling tendencies during adhesive curing and subsequent steps. Curling of the backing is discouraged by the utilization of at least one finishing material carried by said fabric which comprises the product of a reaction between an unsaturated hexafunctional acrylated urethane oligomer component and an unsaturated carboxyfunctional monomer component. These components are caused to react with one another to form cross linking when exposed to actinic or electron beam radiation.

35 Claims, No Drawings

CURL RESISTANT COATED ABRASIVE BACKING WITH RADIATION CURABLE CLOTH FINISHING ADDITIVE

This is a continuation of application Ser. No. 07/201,647 filed on Jun. 2, 1988 now abandoned.

TECHNICAL FIELD

This invention relates to the backings for coated abrasive products that have a cloth substrate. These backings usually contain, in addition to the cloth used, one or more materials called finishing (or cloth finishing) materials or adhesives. These finishing materials fill at least part of the spaces between yarns of the cloth and often provide a smoother finish on the front or back, or both, of the cloth than unfinished cloth would have. This invention is particularly related to backings with finishing materials that are applied as liquids and then converted to solids by exposure to radiation such as an electron beam, ultraviolet (hereinafter UV) light, or the like. Exposure for as little as five seconds is often sufficient for complete cure of these materials. Longer exposures may also be used, but there is normally little economic incentive to use radiation curing on adhesives that require more than one or two minutes for complete solidification when exposed to appropriate radiation.

TECHNICAL BACKGROUND

All conventional coated abrasive backings, including those according to this invention, are normally converted to coated abrasive products by spreading a layer, substantially uniform in thickness, of fluid adhesive (called the "maker" or "make(r) coat" or "make (r) adhesive") on at least one major surface of the backing, dropping or electrostatically propelling graded abrasive grits into the adhesive layer, while it is still fluid, in such a way that the abrasive grits are substantially uniformly distributed over the adhesive coated surface of the backing, then solidifying the adhesive sufficiently to hold the abrasive grits in place. Usually another coat of fluid adhesive (called "size" "size(r) coat", or "size(r) adhesive") is spread over the layer of grits and solidified maker adhesive, and is then itself solidified, in order to improve the resistance of the abrasive grits toward becoming detached from the backing during use of the product.

Usually the process of solidifying either or both of the maker and size adhesives, or of some additional cloth finishing adhesive applied after the first one, involves heating. Heating can, and often does, cause backings to curl, because one major surface of the backing is lengthened or shortened to a greater degree than the other as a result of the heating. Sometimes, the curl disappears when the curled backing is cooled, and sometimes the curl remains, at least to some degree.

Curling of backings during processing, even if the curl disappears after cooling, is objectionable because it can make the product crack or stick to processing machinery, and can cause portions of a product web to adhere to other portions of the web. Such undesirable adhesions between different parts of the web are particularly likely to occur in the festoon ovens that are conventional in coated abrasive manufacturing, when a product curls severely, i.e., more than about 45 degrees, on its edges. (Throughout this application the extent of edge curl in a web is measured by the angle between an imaginary line tangent to the extreme edge of the curled web, in an imaginary plane perpendicular to the plane of the uncurled central part of the web, and a line, in the same imaginary plane, that forms the center line of the flat central portion of the web.)

Conventional cloth finishing adhesives are either resins that solidify by cross linking chemical reactions when heated, latexes that solidify by coalescence of small drops upon drying, or materials such as glue and starch that solidify because of gelation on drying. With these conventional adhesives, the long established practice of the art has achieved generally adequate control of edge curl, although it still causes occasional waste during manufacture of coated abrasive products.

More recently, cloth finishing adhesives that are solidified by chemical reactions induced by radiative energy input have been disclosed. For example, U.S. Pat. No. 4,474,585 of Oct. 2, 1984 to Gruber teaches in its Example 4 the use of a saturant or stabilizing adhesive that is susceptible to cure by UV light. U.S. Pat. No. 4,547,204 of Oct. 15, 1985 to Caul teaches the use of formulations suitable for curing by electron beam radiations.

Adhesives suitable for solidifying by exposure to radiation generally have unsaturated chemical bonds that can polymerize under the influence of radicals, cations, or anions formed by input of radiative energy. Acrylic acid and its derivatives are particularly suitable for radiation curing adhesives, and at least two types of these derivatives are in widespread use. "Acrylate(d) monomers" generally have a core of a di-, tri-, or higher poly-alcohol, usually of relatively low molecular weight, that has been esterified with acrylic acid or substituted acrylic acid to the maximum practicable extent. Typical commercial products in this class are trimethylol propane triacrylate (hereinafter TMPTA) and pentaerythritol triacrylate (hereinafter PETA).

"Acrylate(d) oligomers" are a more diffusely defined class. The cores of these products are generally oligomers of some relatively small molecule such as an isocyanate or epoxide. Depending on the terminal group of the oligomer, it may be converted to an acrylated oligomer by reaction with acrylic acid itself or with some derivative containing a suitable reactive group, such as hydroxy ethyl acrylate. The most common classes of acrylated oligomers are those made from epoxy resins of the bis-phenol A type, novolak phenolic resins, or ester linked urethanes. Suitable acrylated oligomers for coated abrasive finishing usually have average molecular weights per acrylate unit of 250–900. Acrylated oligomers are readily available commercially under such trade names as Novacure from Interez, Inc., Uvithane from Thiokol Corporation, Uvimer from Polychrome, Inc., and Purelast from Polymer Systems Corporation.

Adhesive formulations taught for coated abrasives, by all the published prior art known to applicants, often include trifunctional monomers such as TMPTA and sometimes include tetrafunctional monomers, but do not include monomers or oligomers of higher average functionality than four.

The present applicants have found that all the coated abrasive backings investigated by them with radiation curable cloth finishing adhesives as taught by the prior art are strongly susceptible to curl during subsequent processing, whether in further cloth finishing or in making and sizing, that includes cure of conventional resole phenol—formaldehyde resins with a molar ratio of formaldehyde to phenol of about 1.5. Overcoming curl under such conditions is a major object of this invention.

DESCRIPTION OF THE INVENTION

It has been found that curl problems with coated abrasive backings containing radiation cured finishing adhesives can be substantially reduced in at least two different ways. The adhesives taught in the prior art may be used, along with a heat treatment step before subsequent processing. Alternatively, a different adhesive formulation with greater hardness and cross link density can be used, without the need for any separate heat treatment. Adhesives containing hexafunctional urethane acrylate oligomers and a dimer of acrylic acid are particularly preferred.

The invention may be applied to any type of fabric suitable for use in coated abrasive backings, including the conventional woven jeans, drills, and sateens fabrics traditionally used in the industry, and it is especially valuable when used with stitch bonded fabrics.

The practice of the invention may be further understood from the following examples.

EXAMPLE 1

A fabric made as described generally in U.S. Pat. No. 4,722,203 of Feb. 2, 1988 to Darjee was used for this Example. The fabric used had (i) 18 per 25 mm of the same kind of warp yarns as shown for Fabric Identification Number 1 in Table 1 of U.S. Pat. No. 4,722,203, the complete specification of which is hereby incorporated herein by reference, (ii) the same fill yarn array as shown for Fabric Identification Number 6 in Table 1 of U.S. Pat. No. 4,722,203, and (iii) 18 stitch yarns per 25 mm, with stitching characteristics otherwise as shown for Fabric Identification Number 1 in Table 1 of U.S. Pat. No. 4,722,203.

A preferred fabric for fabrication of the inventive backing is a stitch bonded textile fabric having an array of straight warp yarns. Preferably, this array of warp yarns has an array tensile strength of at lest 30 dekanewtons per centimeter of fabric width and a cover factor of at least 40%. The array of warp yarns is stitched to an array of straight fill yarns disposed on one side of the warp yarn array with a plurality of stitch yarns, each stitch yarn having a tensile breaking strength of at least 0.5 dekanewtons. The stitch yarns are formed in loops around groups of individual yarns of the straight warp and fill yarns to bond the two arrays together into a coherent fabric.

The fabric was first saturated with a mixture of epoxy resin and clay as taught generally in U.S. Pat. No. 4,396,657. The exact formula of the saturant used was, in parts by weight:

| | |
|---|---|
| Water | 1032 parts |
| Daxad 11 dispersant | 4 parts |
| Witconate 1260 dispersant | 6 parts |
| Air washed clay | 600 parts |
| Falcoban S defoamer | 22 parts |
| CMD 35201 epoxy resin emulsion | 2,040 parts |
| Black dye | 31 parts |
| 20 weight % of 2-methyl imidazole in water | 307 parts |

The dry add-on weight of saturant was 66 grams per square meter of area (hereinafter $g/m^2$).

The saturated fabric was then backfilled on the warp side to an add-on weight of 193 $g/m^2$, using a knife on stretched web technique, with the following formulation (parts by weight):

| | |
|---|---|
| Ebecryl 220 | 1250 parts |
| Di(pentaerythritol) pentacrylate | 162 parts |
| TMPTA | 412 parts |
| N-vinyl pyrrolidone | 300 parts |

-continued

| | |
|---|---|
| Beta-carboxyethyl acrylate | 300 parts |
| 2,2-dimethoxy-2-phenyl acetophenone | 82 parts |
| PAC-4774 | 125 parts |
| Triton X-100 | 10 parts |
| Fluorochemical surfactants | 6 parts |
| KR-55 | 6 parts |
| Velveteen R | 250 parts |

This mixture had a viscosity of 9500 centipoises (hereinafter cp) when measured with spindle 2 of a Brookfield viscometer at 26 C. and 6 revolutions per minute (hereinafter rpm).

Ebecryl 220 is primarily a hexa-acrylated urethane oligomer with a molecular weight of about 1000, but also contains some TMPTA; it is available from Radcure Specialties, Inc., Port Washington, Wis.; PAC-4774 is a dispersion of 50 weight % brown pigment in TMPTA, available from Synthetic Products Co., Stratford, Conn.; Triton X-100 is octylphenoxy polyethoxy ethanol; KR-55 is tetrakis[2,2-diallyoxymethyl-1-butoxy] titanium di(di-tridecyl phosphite); Velveteen R is a silica filler with particles averaging about one micron in size.

After backfilling, the cloth was passed between two UV lamps, each capable of delivering up to 19,500 watts of power, for a sufficient time (5–20 seconds) to solidify the backfill composition.

The saturated and backfilled cloth was then front-filled with a mixture of finely divided calcium carbonate, a resole phenolic resin with a molar formaldehyde to phenol ratio of about 1.5, and sufficient water to give a viscosity of 15,000–17,000 cps at room temperature. The dry add-on weight of frontfill was 74–104 $g/m^2$. After frontfill had been applied, the cloth was passed through a festoon oven at 121 C. for about ten minutes to dry and then allowed to cool in a festoon oven at 66 C. for about ten minutes before being wound up. Alternatively, after the frontfill was applied, the web could have been passed through a straight pass oven at 121 C. for about 5 minutes to dry and then cooled by contact for a few seconds against a water chilled cooling roll before being wound up.

The saturated, backfilled, and frontfilled cloth was then backfilled for a second time. The second backfill was a mixture of 37 parts (by weight) resin as used for front-fill with 46 parts finely divided, calcium carbonate and 6 parts of a self-crosslinking acrylate latex with a glass transition temperature after drying of about 30 C. Dry add-on was about 120 $g/m^2$, and drying was at 71–88 C. for about two hours total. This completed cloth finishing. The cloth finish was then converted to a coated abrasive, using resole phenolic resin maker and sizer adhesives, according to procedures well known in the art.

At front filling and each subsequent stage of this processing, the curl of the backing, at the points halfway between the top and bottom of each loop in a festoon oven if that type of oven was used for heating, or between support rolls in a straight pass oven if that was used, was estimated by visual observation. At room temperature immediately after front-filling, the web curled 10 to 15 degrees on the edge, but while in the heated oven, it was flat. When cooled after frontfilling, the web curled only about 5 degrees. Essentially the same degree of curl was observed during second backfilling, but after heating after the application of the making adhesive, the web remained essentially uncurled throughout subsequent processing.

EXAMPLE 2

This was the same as Example 1, except that the amount of backfill added to the cloth was 148 g/m² and the formula of the backfill used was:

| | |
|---|---|
| A-B-512/78 | 1250 parts |
| Dipentaerythritol pentacrylate | 162 parts |
| TMPTA | 412 parts |
| N-vinyl pyrrolidone | 300 parts |
| Beta-carboxy ethyl acrylate | 300 parts |
| 2,2-dimethoxy-2-phenyl acetophenone | 82 parts |
| PAC-4774 | 125 parts |
| Triton X-100 | 10 parts |
| Fluorochemical surfactants | 6 parts |
| KR-55 | 6 parts |
| Velveteen R | 250 parts |

This had a viscosity of 16,750 cp when measured at 27 C. with spindle 2 of a Brookfield viscometer at 6 rpm. A-B-512/78 is a material very similar to the major constituent of Ebecryl 220, but it contains little or no TMPTA; it is available from American Biltrite, Inc., Lawrenceville, N.J. The other materials in this formula have the same meanings as in Example 1. The product made in this example had essentially the same curl behavior as in Example 1.

EXAMPLE 3

This illustrates prior art practice. It was the same as Example 1, except that the amount of backfill added to the cloth was 178 g/m² and the formula of the backfill used was:

| | |
|---|---|
| Uvithane 783 | 930 parts |
| Novacure 3600 | 820 parts |
| Dipentaerythritol penta-acrylate | 325 parts |
| TMPTA | 825 parts |
| N-vinyl pyrrolidone | 780 parts |
| 2,2-dimethoxy-2-phenyl acetophenone | 165 parts |
| PAC-4774 | 250 parts |
| Triton X-100 | 14 parts |
| Fluorochemical surfactants | 23 parts |
| KR-55 | 14 parts |
| 2,2'-azobis(2-methyl butryonitrile) | 10 parts |
| Velveteen R | 500 parts |

This had a viscosity of 40,000 cps at 27 C. when measured with a Brookfield viscometer spindle 3 at 6 rpm. Uvithane 783 is an approximately diacrylated urethane oligomer with about 0.2 equivalents of unsaturation per 100 grams, available from Thiokol; Novacure 3600 is an acrylated epoxy oligomer available from Interez, Inc.; and the other items in this formula have the same meanings as before.

When this web was processed, it had at least 75 degrees of edge curl during heating after every processing step from front filling through final sizing over the grain. Such behavior in very undesirable commercially, because too much waste results.

EXAMPLE 4

This was the same as Example 3, except that (i) after the first backfilling, the cloth was heated at 121 C. for five hours and (ii) as a result of the heating, the web was essentially flat during the heating after every subsequent processing step.

While heating after backfilling thus is an effective embodiment of this invention, it significantly delays the processing, thereby increasing cost, and therefore is generally less preferable than the use of appropriate formulations, as illustrated in Examples 1 and 2, that avoid curl without requiring more than the normal processing time.

EXAMPLE 5

This was the same as Example 1, except that the order of second backfilling and of frontfilling was reversed. This order of operations gives better adhesion between the first and second backfill materials than does the sequence of Example 1.

EXAMPLE 6

This was the same as Example 5, except that (i) the same formulation as for the first backfill was also used for the second backfill, instead of the phenolic resin based second backfill used in Example 5, and (ii) the dry add-on weight of second backfill was about 120 g/m². Excellent second backfill adhesion was obtained, and flatness during all subsequent processing was observed.

EXAMPLE 7

This example, which is not within the scope of the invention, shows the importance of the beta-carboxy ethyl acrylate constituent. This example was performed in the same way as Example 2, except that the backfill formulation used was:

| | |
|---|---|
| A-B-512/78 | 1250 parts |
| Dipentaerythritol pentacrylate | 162 parts |
| TMPTA | 612 parts |
| N-vinyl pyrrolidone | 400 parts |
| 2,2-dimethoxy-2-phenyl acetophenone | 82 parts |
| PAC-4774 | 125 parts |
| Triton X-100 | 10 parts |
| Fluorochemical surfactants | 6 parts |
| KR-55 | 6 parts |
| Velveteen R | 250 parts |

Comparison of this formula with that of Example 2 shows that the beta-carboxy ethyl acrylate used there has been replaced in this formula by an equal amount of TMPTA and N-vinyl pyrrolidone combined. During subsequent processing of this example, the web curled at least ten degrees during front-fill drying, at least fifteen degrees during maker cure, and at least thirty degrees during sizing cure.

What is claimed is:

1. A coated fabric for use in preparing a coated abrasive product comprising:

a. a fabric; and b. at least one finishing material carried by said fabric, said finishing material including the product of a reaction between an unsaturated hexafunctional acrylated urethane oligomer component and an unsaturated carboxyfunctional monomer component.

2. The coated fabric as recited in claim 1 wherein said carboxyfunctional monomer is a beta carboxyethyl acrylate.

3. The coated fabric as recited in claim 1 wherein said finishing material has been cured by exposure to actinic or electron beam radiation.

4. The coated fabric as recited in claim 1 wherein the components of said finishing material are capable of rapid polymerization under the influence of actinic or electron beam radiation.

5. The coated fabric as recited in claim 1 wherein, after application of said finishing material in liquid form to said fabric, said backing has been heat treated to temperatures between 150° degrees F. (66° C.) and 250° degrees F. (121° C.) for a time sufficient to solidify said finishing material, whereby curl of said backing by more than five degrees is prevented.

6. The coated fabric as recited in claim 1 wherein said finishing material acts as a backfill or backsizing adhesive.

7. The coated fabric as recited in claim 1 wherein said fabric contains yarns selected from the group consisting of: 1) polyethylene terephthalate yarns and 2) a mixture of polyethylene terephthalate and nylon polyamide yarns.

8. A coated fabric according to claim 1, wherein said fabric is of woven construction.

9. A coated fabric according to claim 1, wherein said fabric is of stitchbonded construction.

10. A coated fabric according to claim 8, wherein said fabric is selected from the group consisting of jeans, drills and sateen fabrics.

11. A backing according to claim 9, wherein said fabric is a stitch bonded fabric comprising:

(a) an array of straight warp yarns having an array tensile strength of at least 30 dekanewtons per centimeter of fabric width;

(b) an array of straight fill yarns disposed on one side of said array and having a cover factor of at least 40%; and (c) a plurality of stitch yarns, each such yarn having a tensile breaking strength of at least 0.5 dekanewtons, formed in loops around groups of individual yarn members of said arrays of straight warp yarns and straight fill yarns, whereby the two said arrays of yarns are bonded into a coherent fabric.

12. A coated fabric according to claim 2, wherein said hexafunctional acrylated urethane oligomer and carboxyfunctional monomer together comprise at least 40% by weight of the fluid ingredients in said finishing material prior to their interaction.

13. A coating fabric according to claim 11, wherein said hexafunctional acrylated urethane oligomer and carboxyfunctional monomer together comprise at least 40% by weight of the fluid ingredients in said finishing material prior to their interaction.

14. A process for fabricating the coated fabric of claim 1, said process comprising:

a. applying to a fabric a fluid adhesive which includes an unsaturated hexafunctional urethane oligomer component and an unsaturated carboxyfunctional monomer component; and b. subsequently solidifying said adhesive by exposing said fabric and adhesive to actinic or electron beam radiation thereby causing cross-linking between said components, whereby said process provides a coated fabric which is used to prepare a coated abrasive backing having improved chemical adhesion and which curls less than five degrees at its edges after being subjected to said applying and said solidifying steps.

15. A process according to claim 14, wherein said fabric consists essentially of yarns of polyethylene terephthalate.

16. A coated fabric for use in preparing a coated abrasive comprising:

a. a saturated fabric; and b. at least one finishing material carried by said fabric, said finishing material including the product of a reaction between an unsaturated hexafunctional acrylated urethane oligomer component and an unsaturated carboxyfunctional monomer component.

17. The coated fabric of claim 16, wherein said carboxyfunctional monomer is a beta carboxyethyl acrylate.

18. The coated fabric of claim 17, wherein said hexafunctional acrylated urethane oligomer and carboxyfunctional monomer together comprise at least 40% by weight of the fluid ingredients in said finishing material prior to their interaction.

19. The coated fabric of claim 16, wherein said finishing material has been cured by exposure to actinic or electron beam radiation.

20. The coated fabric of claim 16, wherein the components of said finishing material are capable of rapid polymerization under the influence of actinic or electron beam radiation.

21. The coated fabric of claim 16, wherein after application of said finishing material in liquid form to said fabric, said backing has been treated to temperatures between 150° F. (66° C.) and 250° F. (121° C.) for a time sufficient to solidify said finishing material, whereby curl of said backing by more than five degrees is prevented.

22. The coated fabric of claim 16, wherein said finishing material is a backfill or backsizing adhesive.

23. The coated fabric of claim 16, wherein said fabric contains yarns selected from the group consisting of (i) polyethylene terephthalate yarns and (ii) a mixture of polyethylene terephthalate and nylon polyamide yarns.

24. The coated fabric of claim 16, wherein said fabric is of woven construction.

25. The coated fabric of claim 24, wherein said fabric is selected from the group consisting of jeans, drills, and sateen fabrics.

26. The coated fabric of claim 16, wherein said fabric is of stitchbonded construction.

27. The coated fabric of claim 26, wherein said fabric is a stitchbonded fabric comprising:

(a) an array of straight warp yarns having an array tensile strength of at least 30 dekanewtons per centimeter of fabric width;

(b) an array of straight fill yarns disposed on one side of said array and having a cover factor of at least 40%; and (c) a plurality of stitch yarns, each such yarn having a tensile breaking strength of at least 0.5 dekanewtons, formed in loops around groups of individual yarn members of said arrays of straight warp yarns and straight fill yarns, whereby the two said arrays of yarns are bonded into a coherent fabric.

28. The coated fabric of claim 27, wherein said hexafunctional acrylated urethane oligomer and carboxyfunctional monomer together comprise at least 40% by weight of the fluid ingredients in said finishing material prior to their interaction.

29. A process for fabricating the coated fabric of claim 16, said process comprising:

a. applying to a saturated fabric a fluid adhesive which includes an unsaturated hexafunctional urethane oligomer component and an unsaturated carboxyfunctional monomer component; and b. subsequently solidifying said adhesive by exposing said fabric and adhesive to actinic or electron beam radiation thereby causing cross-linking between said components, whereby said process provides a coated fabric which is used to prepare a coated abrasive backing having improved chemical adhesion and wherein the coated fabric curls less than five degrees at its edges after being subjected to said applying and solidifying steps.

30. The process of claim 29, wherein said fabric consists essentially of yarns of poly(ethylene terephthalate.)

31. In a coated fabric for use in preparing a coated abrasive product comprising a fabric having edges and a cloth finishing adhesive that is the cured product of a formulation which (i) contains chemical unsaturation and (ii) is cured by exposure to actinic or electron beam radiation, the improvement comprising after curing of the formulation heating said coated fabric to a sufficiently high temperature and for a sufficient period of time which are sufficient to prevent curling of the edges by more than about five degrees.

32. The coated fabric of claim 31, wherein said textile fabric consists essentially of yarns of poly(ethylene terephthalate.)

33. The coated fabric of claim 31, wherein said textile fabric is a stitchbonded fabric comprising:

(a) an array of straight warp yarns having an array tensile strength of at least 30 dekanewtons per centimeter of fabric width;

(b) an array of straight fill yarns disposed on one side of said array and having a cover factor of at least 40%; and (c) a plurality of stitch yarns, each such yarn having a tensile breaking strength of at least 0.5 dekanewtons, formed in loops around groups of individual yarn members of said arrays of straight warp yarns and straight fill yarns, whereby the two said arrays of yarns are bonded into a coherent fabric.

34. The coated fabric of claim 31 wherein said heating is for at least five hours and at a temperature of at least 121° C.

35. The coated fabric of claim 31, wherein after said heating step the fabric is further coated with aqt least one additional cloth finishing adhesive which is cured and wherein the edge curl remains less than about five degrees.

* * * * *